United States Patent
Moretti

(10) Patent No.: US 6,588,864 B1
(45) Date of Patent: Jul. 8, 2003

(54) TEMPERATURE CONTROL FOR AN AIR CONDITIONING UNIT

(75) Inventor: Stephen L. Moretti, Auburn, NY (US)

(73) Assignee: Carrier Corporation, Farmington, CT (US)

(*) Notice: Subject to any disclaimer, the term of this patent is extended or adjusted under 35 U.S.C. 154(b) by 31 days.

(21) Appl. No.: 09/858,799

(22) Filed: May 16, 2001

(51) Int. Cl.7 .................................................. G05G 1/10
(52) U.S. Cl. ........................ 312/236; 200/11 R; 74/553; 70/278.4; 70/333
(58) Field of Search ................. 74/553, 10.2, 10 R; 16/433, 441; 70/209, 207, DIG. 39; 40/331; 116/79; 200/293, 293.1; 250/465.1; 292/336.3, 347, 348, 357; 338/163; 345/184; 600/147; 968/30

(56) References Cited

U.S. PATENT DOCUMENTS 3,561,287 A * 2/1971 Lawrence .................... 16/441
3,903,383 A * 9/1975 Marker ...................... 200/11 G
4,546,219 A * 10/1985 Rose ........................ 200/11 R
5,159,706 A * 10/1992 Hodsdon .................. 200/11 R

* cited by examiner

Primary Examiner—Lanna Mai
Assistant Examiner—Jerry A. Anderson
(74) Attorney, Agent, or Firm—Wall Marjama & Bilinski

(57) ABSTRACT

Apparatus for preventing the unwanted changing of the temperature range setting of an air conditioner unit. The shaft of a unit's thermostat is passed through a first panel and a control knob is mounted upon the distal end of the shaft. A raised second panel is placed over the first panel having an opening for rotatably receiving the body of the control knob. A radially extended arm is mounted upon the control knob so that it swings over an arcuate path of travel between the panels as the shaft turns. Spaced apart holes are formed in one of the panels along the arcuate path of travel and stop pins are removably mounted in said holes on either side of the arm to control the range of movement of the shaft and thus the operating range of the air conditioner.

8 Claims, 3 Drawing Sheets

TEMPERATURE CONTROL FOR AN AIR CONDITIONING UNIT

FIELD OF THE INVENTION

This invention relates generally to apparatus for preselecting the operating range of an air conditioning unit, and specifically to apparatus for preventing unauthorized changing of the operating range of an air conditioning unit once the range has been selected.

BACKGROUND OF THE INVENTION

This present invention will be described with specific regards to a packaged terminal air conditioning unit (PTAC) of the type typically utilized in hotels, motels, inns or other similar type lodgings wherein the unit is adapted to provide heating or cooling to a specific comfort area within a building. The unit is generally housed within a sleeve mounted in an outside wall of a building and includes an outdoor section and an indoor section that are separated by a wall containing a covering of insulating material. The insulation prevents heat from being exchanged freely between the sections and also provides a sound barrier.

The occupant of the lodging is afforded the ability and accessibility to control the output of the unit so that the temperature within the occupied comfort area can be selectively regulated within a temperature range which, in most cases, is the entire operational range of the unit. Accordingly, the unit is oftentimes set at an extremely high level above what might be considered a normal comfort level resulting in a considerable waste of energy and an unnecessary increase in the proprietor's operating expenses.

SUMMARY OF THE INVENTION

It is therefore an object of the present invention to improve air conditioning units and, in particular, to units that are located in hotels, motels and other public places of lodging where the occupant has free access to the operation of the unit.

It is a further object of the present invention to conserve energy.

Another object of the present invention is to provide a tamper proof temperature control for an air conditioner unit wherein the operation range of the unit can be selected within desired limits.

Yet another object of the present invention is to provide an adjustable temperature control for an air conditioner unit wherein the temperature range of the control can only be selected by authorized personnel.

These and other objects of the present invention are attained by a tamper proof apparatus for use in an air conditioning unit for controlling temperature output of the unit within a preselected range of temperatures. A first panel is mounted in the unit and the distal end of a thermostat control knob is arranged to pass upwardly through the panel. A control knob is placed over the distal end of the shaft that includes a radially extended arm that is positioned adjacent to the control panel. The arm describes an arcuate path of travel as the knob and shaft are rotated. A raised second panel is mounted over the first panel in a spaced apart relationship therewith. The second panel includes an opening in which the control knob is rotatably contained. The arm, however, is captured between the two panels. A series of spaced apart holes are located in the lower panel along the arcuate path of travel described by the arm. Stop members are interchangeably mounted on either side of the arm within selected holes to limit the range of rotation of the arm and thus the range of control of the thermostat. The stop members, like the arm, are located between the panels so that the location of the stop members cannot be altered without separating the panels.

BRIEF DESCRIPTION OF THE DRAWING

For a better understanding of these and other objects of the present invention, reference will be made to the following detailed description of the invention which is to be read in connection with the accompanying drawing, wherein.

DETAILED DESCRIPTION OF THE INVENTION

Figure 1:
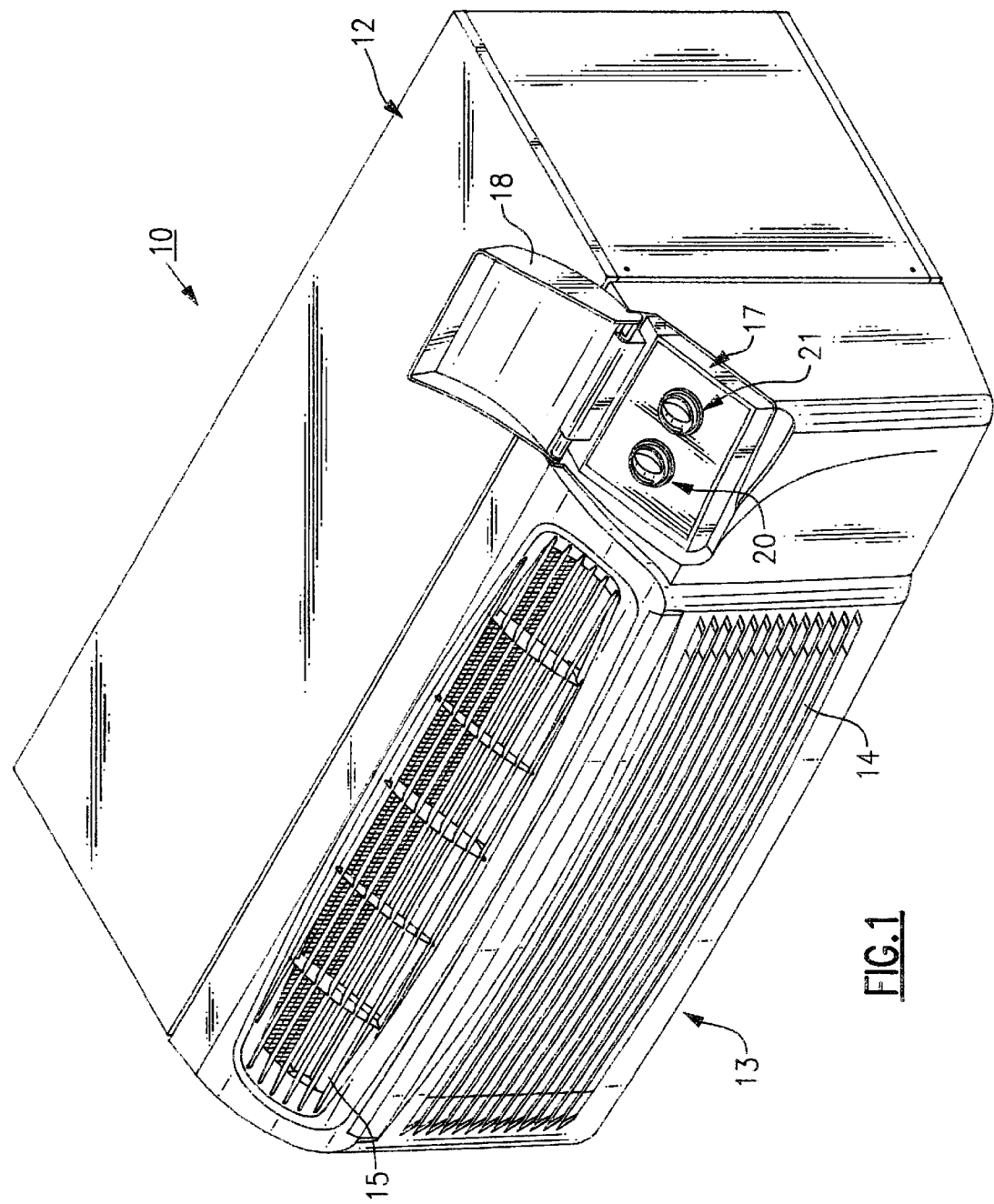
FIG. 1 is a perspective view of a packaged terminal air conditioning unit embodying the teachings of the present invention.

Turning initially to FIG. 1, there is illustrated an air conditioning unit generally referenced 10, embodying the teachings of the present invention. The unit in this embodiment of the invention is a package terminal air conditioning unit sometimes referred to as a PTAC unit of the type generally found in hotels, motels, inns and other similar public places of lodging for providing comfort air to a specific indoor space. Although the invention will be described with specific reference to this type of air conditioning unit, it should be evident from the disclosure below that the invention has broader applications and can be adapted for use in any type of unit that requires some type of control within a range of settings.

The air conditioning unit is housed within a rectangular shaped sleeve 12 that is contained within an outside wall of the comfort area that is being serviced by the unit. The sleeve has standard dimensions of height and width so that various units provided by different manufacturers can be interchangeably mounted therein. The front section of the unit is housed within a front cover 13. The front cover is supported upon the main frame of the unit and is arranged to close against the front of the sleeve as illustrated in FIG. 1. The cover has an inlet opening 14 through which return air from the comfort area is drawn into the unit and an outlet opening 15 through which conditioned air is discharged back into the comfort air. The unit can provide either heating or cooling to the comfort region depending upon the selected mode of operation.

The front cover 13 of the air conditioning unit contains a recessed well 17 that is closed by a hinged door 18 that complements the general contour of the cover when the door is closed. The door is illustrated in FIG. 1 in an open position. A pair of control knobs 20 and 21 are shown mounted inside the well that are accessible to an occupant of the comfort area. As further illustrated in FIG. 4, knob 20 is a temperature control knob for varying the output temperature of the unit within a given range of temperature. Knob 21 is a mode select control for changing the operational mode of the unit between a heating mode and a cooling mode.

Heretofore, the occupant of the comfort area could set the temperature level of the unit at any desired level within the full temperature range of the unit. This oftentimes resulted in the unit being operated at an excessively high level, which, in turn, wastes a good deal of energy. The present invention allows the proprietor of a public lodging to set a preselected temperature range within certain limits that will provide for comfortable heating and cooling, while at the same time, preventing the excessive use of energy.

Figure 2:
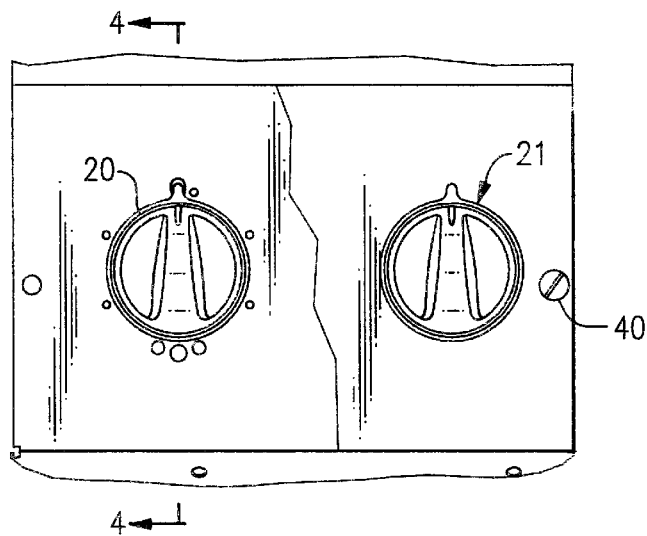
FIG. 2 is a front elevation with portions broken away further showing the control section of the unit.
Figure 4:
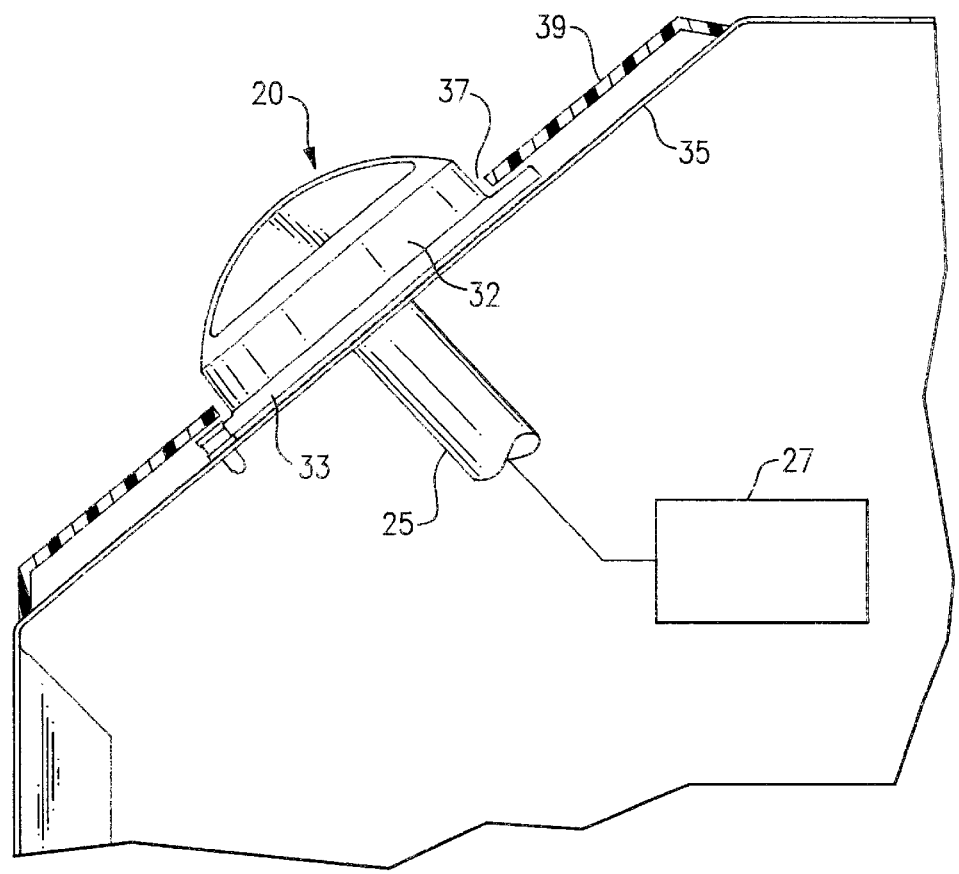
FIG. 4 is a sectional view taken along lines 4—4 in FIG. 2.
Figure 3:
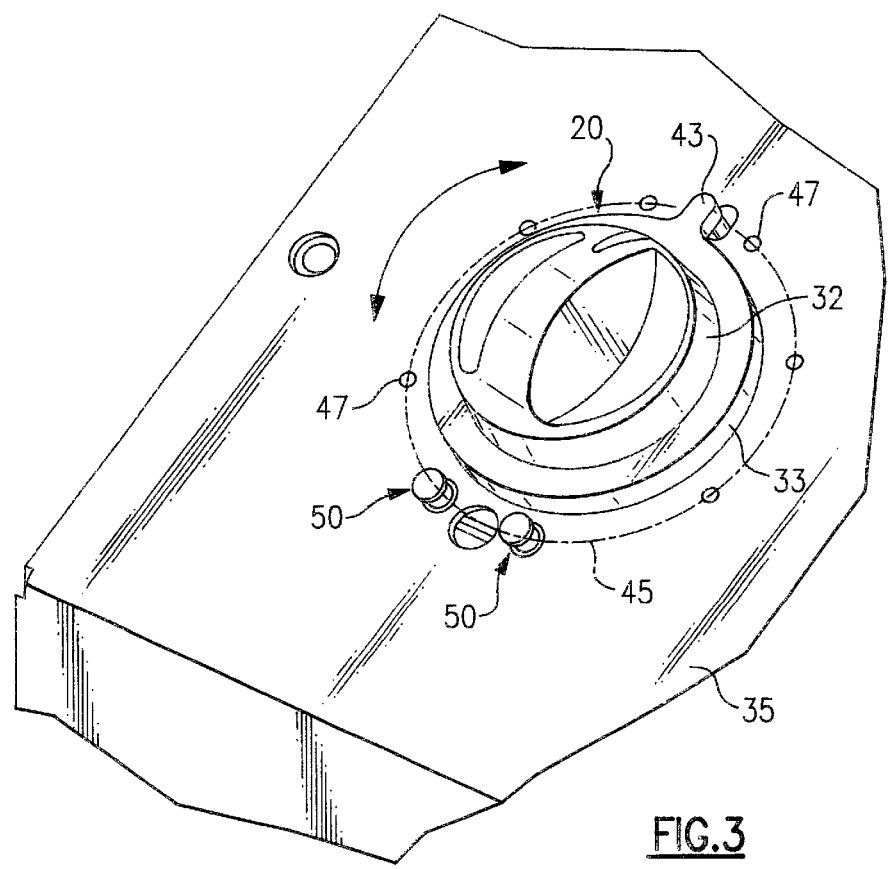
FIG. 3 is an enlarged partial perspective view of the control section with the cover panel removed showing the temperature control knob in greater detail.
Figure 5:
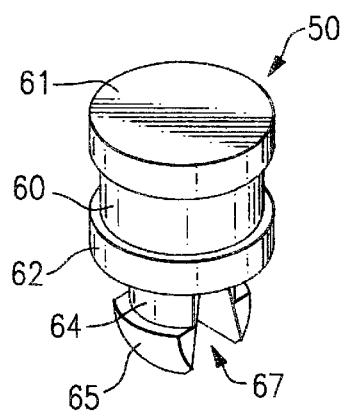
FIG. 5 is an enlarged perspective view of a stop member employed in the practice of the present invention.
Figure 6:
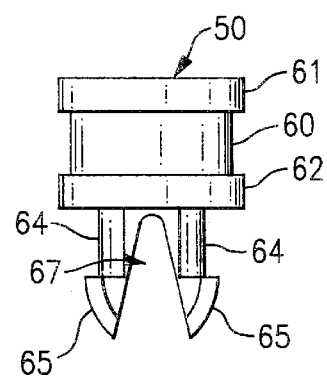
FIG. 6 is a front elevation of the stop member illustrated in FIG. 5.

As best illustrated in FIGS. 2–4, the temperature control knob 20 is slidably contained upon the control shaft 25 which, when rotated, regulates the setting of a thermostat 27. The term thermostat, as herein used, refers to any type of device known and used in the art for controlling the comfort air temperature discharged from the unit. The temperature knob contains a cylindrical body section 32 having a radially expanded flange 33 located about the bottom section of the body section. In assembly, the distal end of the temperature control shaft is passed upwardly through an opening in a first lower panel 35 that is part of the unit's support frame 36. The temperature control knob is positioned on the shaft so that the flange is adjacent to and in parallel relation with the top surface of the lower panel.

An upper panel 39 having an opening for rotatably containing the body section of the control knob is then passed downwardly over the knob and brought to a position to provide a gap or space between the panels. The opening 37 in the upper panel is of a size such that the flange cannot pass therethrough. As a result, the flange is captured between the two panels. In this embodiment, the upper panel is the bottom wall of the recessed well and forms part of the front cover of the unit. The upper panel is automatically brought to the desired position over the lower panel when the front cover is closed against the sleeve. The two panels, however, may be mounted in a spaced apart relationship by any suitable means without departing from the teachings of the invention. As shown in FIG. 2, the panels may, for example, be joined together in assembly by spacer bolts 40 with the control knob flange being captured between the panels.

As best illustrated in FIG. 3, an arm 43 is integrally joined to the temperature control knob flange that extends outwardly over the lower panel. The body section of the knob, along with the flange and the arm, are molded from a suitable plastic material to provide a single piece member. Like the flange, the arm is also captured between the panels. The arm is thus rotated over a circular path of travel described by the hole circle 45 illustrated in FIG. 3. A series of spaced apart holes 47 are formed in the lower panel about the hole circle. The holes are adapted to receive therein stop pins 50 for intercepting the temperature control knob arm as it is rotated over its circular path of travel. In assembly, a stop pin is mounted on either side of the arm whereby the stop pins control the range of movement of the knob and thus, the temperature range of the unit.

Each stop pin is molded of a resilient plastic and includes a cylindrical upper section 60 having top and bottom annular flanges 61 and 62. A bifurcated base section 64 depends from the upper section of the pin and contains a pair of legs 64—64, each of which terminates in a tapered tab 65. The two legs are separated by a cone-shaped opening 67. The legs have sufficient resiliency so that they can flex inwardly as the base of the stop pin is inserted into one of the receiving holes in the lower panel. A slight downward pressure places the lower flange on the pin body into contact with the top surface of the lower panel. At this time, the tabs on the legs clear the panel and the tabs move under the panel to secure the pin in place. The pins are easily removed from the receiving hole by applying a slight lateral pressure to the pin while pulling the pin upwardly.

The height of each pin body is less that the gap distance between panels. Accordingly, the pins, along with the control knob arm, are captured between the panels in assembly thereby denying access to unauthorized personnel. In the case of the air conditioning unit illustrated in FIG. 1, access to the pins can only be had by removal of the front cover of the unit. In other embodiments of the invention the upper panel can be joined in assembly by spacer bolts having heads that can only be turned by special tools thus further rendering the assembly tamper proof.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. Tamper-proof apparatus for adjusting the range of settings of a controllable component that includes:
   a first panel;
   a control shaft coupled to the controllable component, a distal end of said control shaft passing through an opening in the first panel;
   a control knob mounted upon the distal end of said shaft for rotation therewith, said knob having a radially extended arm mounted upon a lower section of said knob adjacent to said first panel so that said arm moves over an arcuate path of travel as the knob is rotated;
   a second panel mounted over said first panel to provide a space between the panels, said second panel having an opening for rotatably containing a body section of said knob, said opening being of a size to prevent the arm from passing through said opening whereby said arm is captured between said panels;
   a series of holes contained in said first panel, said holes spaced apart along the arcuate path of travel described by said arm;
   a stop member removably mounted in a selective one of said holes wherein the stop member extends into the space between said panels to intercept the arm as the arm is rotated along said path of travel to limit the range of rotation of said shaft, and wherein the stop member is removable from the selective one of said holes only when said second panel is unmounted from said first panel.

2. The apparatus of claim 1 that further includes fastening means for securing the panels together in a spaced apart relationship.

3. The apparatus of claim 1 that further includes a second stop member, said stop members being selectively mounted in holes on either side of said arm.

4. The apparatus of claim 1 wherein said arm is connected to an annular flange mounted upon the body section of said control knob, said flange along with said arm being captured between said panels.

5. The apparatus of claim 4 wherein the body section of the knob and the annular flange and arm are all integrally molded of a plastic material.

6. Tamper proof temperature control apparatus for an air conditioning unit that includes:

a first panel mounted upon a unit support frame;

a thermostat for controlling an output of the unit mounted behind the first panel, said thermostat having a control shaft, a distal end of which passes through an opening in said first panel;

a control knob having a body section and a radially extended arm mounted on a lower part of said body section, said control knob mounted upon the distal end of said shaft for rotation therewith so that said arm describes a circular path of travel as the shaft is turned;

a second panel mounted in a removable cover of said unit, that is positioned in a spaced apart relationship with the first panel when the cover is in a closed position, said second panel having an opening for rotatably containing the body section of said knob, said opening being of a size such that said arm cannot pass through said opening whereby the arm is captured between panels when the cover is closed;

a series of holes contained in the first panel, said holes being spaced apart along the circular path of travel of said arm, and repositionable stop members mounted between said panels in preselected holes on either side of said arm for intercepting said arm and thus limiting a range of rotation of said control knob;

wherein the stop members are removable from the preselected holes only when said cover is removed from said unit.

7. The apparatus of claim 6 wherein said stop members are mounted in said first panel.

8. The apparatus of claim 6 wherein said arm is mounted upon an annular flange that surrounds the lower part of said body section, said flange being of a size such that the flange cannot pass through said opening.

* * * * *